US005801887A

United States Patent [19]
Sato

[11] Patent Number: 5,801,887
[45] Date of Patent: Sep. 1, 1998

[54] WIDE-ANGLE ZOOM LENS SYSTEM

[75] Inventor: Haruo Sato, Saitama-ken, Japan

[73] Assignee: Nikon Corporation, Tokyo, Japan

[21] Appl. No.: 785,597

[22] Filed: Jan. 17, 1997

[30] Foreign Application Priority Data

Jan. 31, 1996 [JP] Japan .................. 8-037169

[51] Int. Cl.$^6$ .................. G02B 15/14
[52] U.S. Cl. .................. 359/691; 359/682; 359/689
[58] Field of Search .................. 359/691, 689, 359/682

[56] References Cited

U.S. PATENT DOCUMENTS 4,571,031  2/1986  Kato .................. 359/689
4,726,667  2/1988  Tachihara .................. 359/682

FOREIGN PATENT DOCUMENTS

A-5-27166  2/1993  Japan .
A-5-93858  4/1993  Japan .

*Primary Examiner*—Georgia Y. Epps
*Assistant Examiner*—Evelyn A. Lester
*Attorney, Agent, or Firm*—Oliff & Berridge, PLC

[57] ABSTRACT

A wide-angle zoom lens system is provided that has favorable image formation properties and is compact. The system preferably is a two group composition of negative/positive. The first lens group G1 has a negative meniscus lens component L1n having a convex surface facing towards the object side and a positive lens component L1p arranged closer to the image side than the negative lens component L1n. A front lens subgroup of the second group G2F includes, in order from the object side, a positive lens component L2F1 of positive refractive power, a negative lens component L2F2 of negative refractive power and a positive lens component L2F3 of positive refractive power. A rear lens subgroup of the second group G2R includes at least a negative lens component L2Rn and a positive lens component L2Rp.

21 Claims, 14 Drawing Sheets

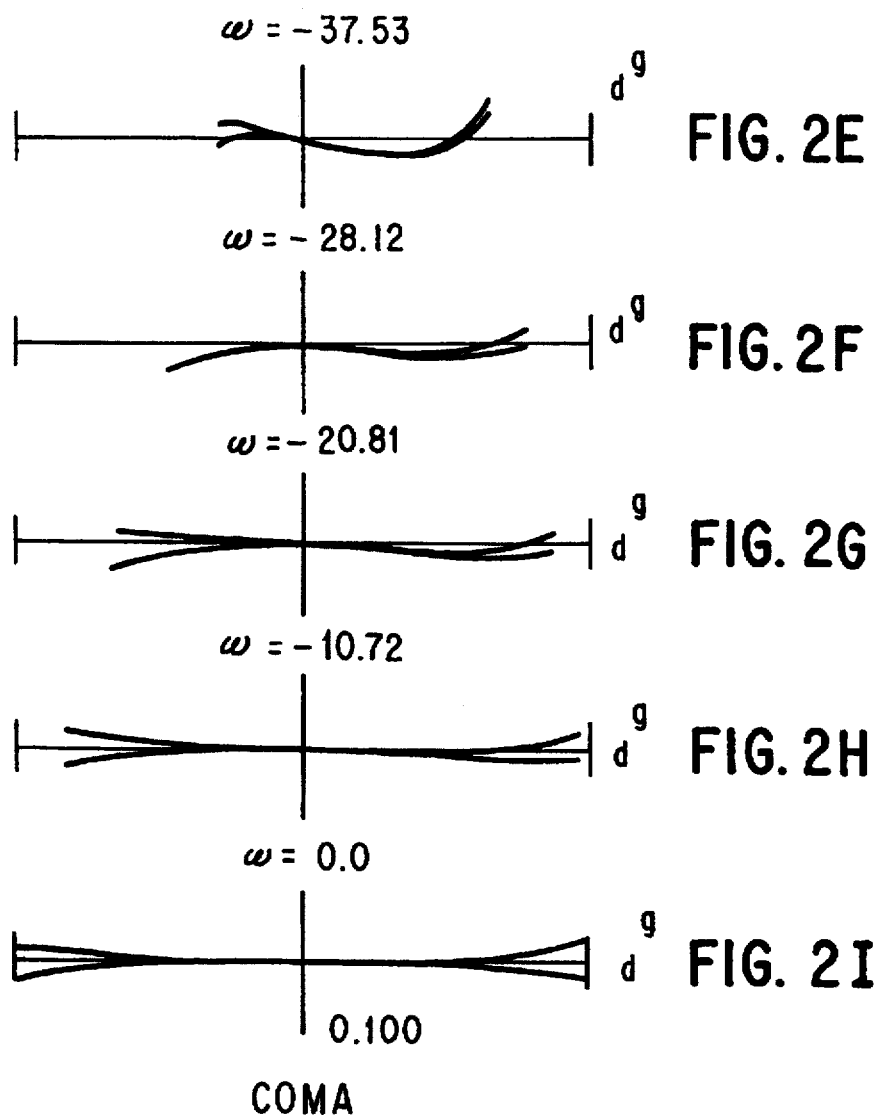

COMA

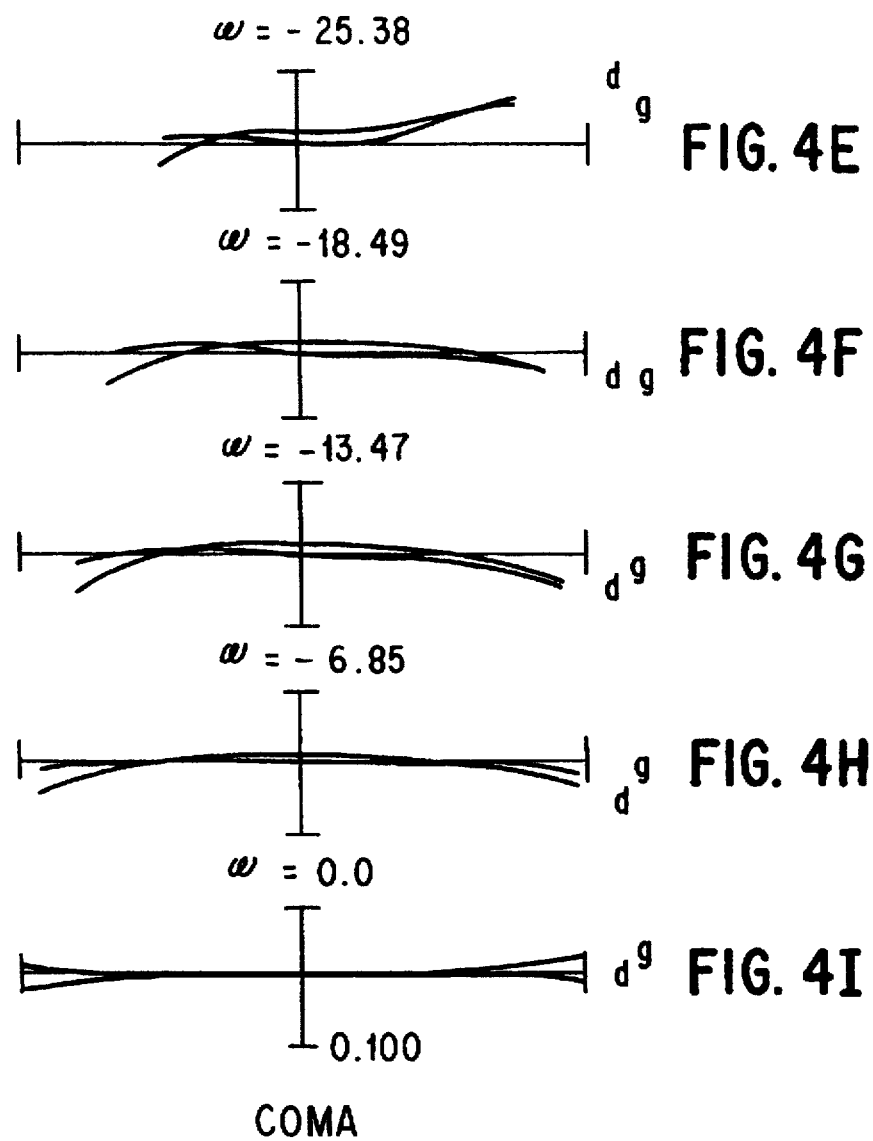
COMA

COMA

SPHERICAL ABERRATION
FNO = 4.88
0.500

ASTIGMATISM
Y = 35.00
0.500

DISTORTION
Y = 35.00
2.000%

LATERAL CHROMATIC ABERRATION
-0.050

COMA

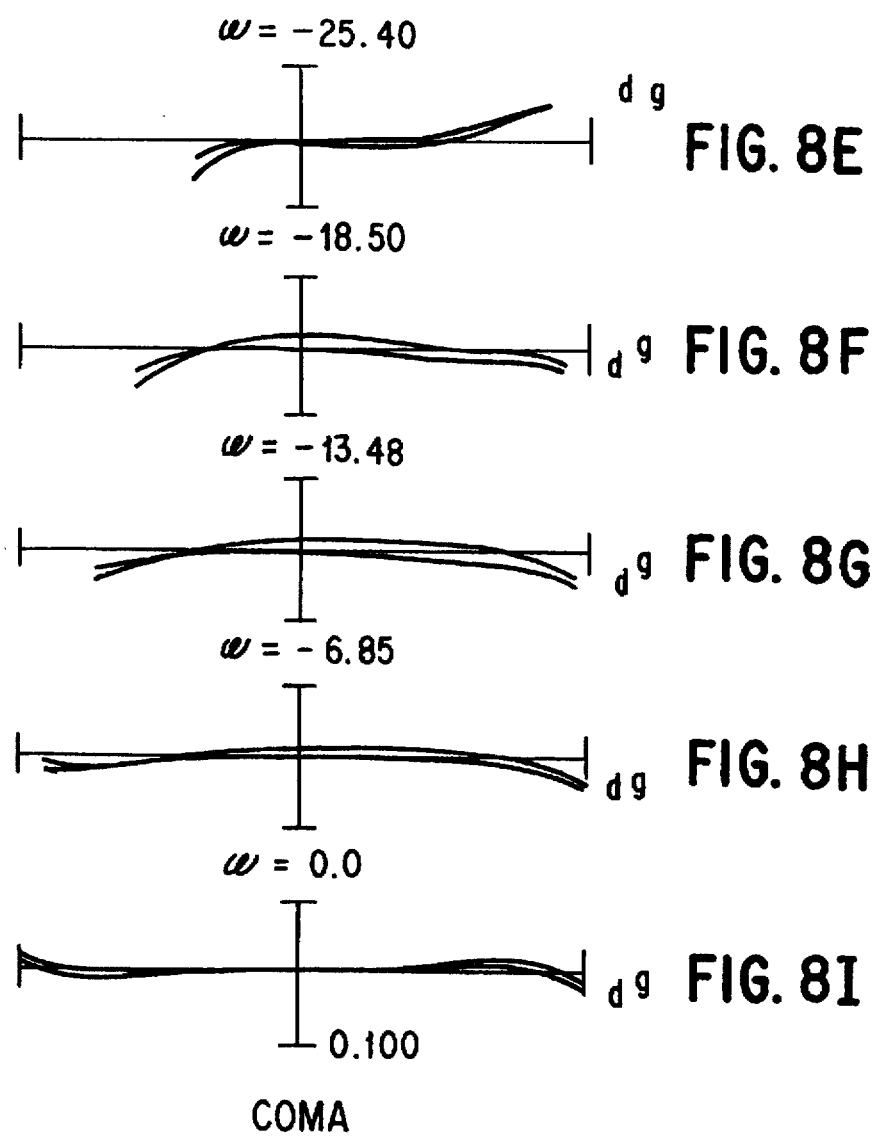

WIDE-ANGLE ZOOM LENS SYSTEM

BACKGROUND OF THE INVENTION

1. Field of the Invention

The present invention relates to a compact wide-angle zoom lens with a short back focal length. More particularly, the present invention relates to a wide-angle zoom lens for use with a medium size camera, and especially for a lens shutter type camera.

2. Description of Related Art

Conventional zoom lenses use a lens shutter type camera with the zoom ratio being double magnification and having a zoom lens of a two group composition of positive/negative. However, in a zoom lens with a front positive lens, there are weaknesses such as it being unsuitable for wide-angle use. Thus, the lens group movement amount due to zooming is large and accordingly the F number variations are large.

In case that a two group zoom lens having a front negative lens group that is generally used in a single reflex type camera is used in a lens shutter type camera, the back focal length is long and the total length also becomes long. This is undesirable because it becomes too big.

Japan Laid-Open Patent Number Hei 5-27166 and Japan Laid-Open Patent Number Hei 5-93858, the subject matters of which are incorporated herein by reference, disclose a zoom lens that shortens the back focal length by providing the rear group composition with a front negative lens. The arrangement is not the general positive/positive/negative/positive lens component arrangement, but rather is arranged with the negative lens component on the image side.

The zoom lens disclosed in Japan Laid-Open Patent Hei 5-27166 has a large F number in the telephoto state meaning it is also dark. The total length is long and the back focal length is also long which makes this a relatively large zoom lens. In addition, the angle of field when in the wide-angle state is not very large. Furthermore, when proceeding in the wide-angle direction, the lens has a tendency to increase in scale which is undesirable. The curvature of the image plane and the astigmatism is large when in the vicinity of the telephoto state. It also has an aberration property that becomes worse when moving in the positive direction. This is undesirable.

The zoom lens disclosed in Japan Laid-Open Patent Number Hei 5-93858 has a short back focal length and a short total length by including a zoom lens that is relatively small in scale. However, with the zoom lens in Japan Laid-Open Patent Hei 5-27166, the aberration property is undesirable. The astigmatism, the curvature of field, the distortion and the F number in the telephoto state is large. With this type of aberration property, it is difficult to arrange the refractive power to construct a second lens group. In addition, when using the zoom lens in Japan Laid-Open Patent Number Hei 5-93858 for a medium sized camera, the deformation amount of the distortion aberration as well as such absolute quantity is considerably large.

SUMMARY OF THE INVENTION

It is an object of the present invention to provide a wide-angle zoom lens that is hi-speed and has favorable image formation properties while remaining compact and having a fundamental composition of a negative/positive two group composition.

A zoom lens is provided, in order from the object side, a first lens group G1 of negative refractive power and a second lens group G2 of positive refractive power. The zoom lens performs zooming by changing the air spacing between the first lens group G1 and the second lens group G2. The first lens group G1 has at least a negative meniscus lens component L1n with the convex surface facing towards the object side and a positive lens component L1p arranged closer to the image side than the negative meniscus lens component L1n. The second lens group G2 has, in order from the object side, a front lens subgroup G2F of positive refractive power and a rear lens subgroup G2R of negative refractive power. The front lens subgroup G2F includes, in order from the object side, at least a first lens component L2F1 of positive refractive power, a second lens component L2F2 of negative refractive power and a third lens component L2F3 of positive refractive power. The rear lens subgroup G2R may have at least a negative lens component L2Rn and a positive lens component L2Rp.

Further, the present invention provides a zoom lens that may satisfy the following conditions when the focal length of the rear lens subgroup of the second group G2R is f2R, the focal length of the entire system in the wide-angle state is fW, the radius of curvature of the surface of the most object side of the negative meniscus lens component L1n is Ra, and the radius of curvature of the surface of the most image side of the negative meniscus lens component L1n is Rb:

$-3 \leq f2R/fW \leq -1.33$ $-4 \leq (Rb+Ra)/(Rb-Ra) < -1$.

Further, the following condition may also be satisfied when the air spacing on the axis between the front lens subgroup of the second group G2F and the rear lens subgroup of the second group G2R is DFR and the total thickness on the axis from the lens surface of the most object side of the second lens group G2 until the lens surface of the most image side is DG2:

$0.1 \leq DFR/DG2 \leq 0.6$.

A wide-angle zoom lens may be achieved that is hi-speed and has favorable image formation properties as well as having a small back focal length, total length and filter measurement while remaining compact. The zoom lens may also be achieved that favorably corrects the distortion and has a large F number in the telephoto state compared to prior art zoom lenses.

An explanation of the fundamental composition of the zoom lens of the present invention will now be given.

The zoom lens may be made from a fundamental composition of a negative-positive two group composition that provides, in order from the object side, a first lens group G1 of negative refractive power and a second lens group G2 of positive refractive power. The second lens group G2 has, in order from the object side, a front lens subgroup G2F of positive refractive power and a rear lens subgroup G2R of negative refractive power.

When considering the separation of the total length into the first lens group G1 of negative refractive power, a front lens subgroup of the second group G2F of positive refractive power, and a rear lens subgroup of the second group G2R of negative refractive power, it can be understood that the zoom lens has a three group composition of a negative/positive/negative structure. This negative/positive/negative three group composition is appropriate to a wide angle zoom lens and is fundamentally beneficial to the revision of the distortion as well as the lateral chromatic aberration. Accordingly, the present invention may provide the negative/positive/negative group composition internally within the zoom lens of the negative/positive two group composition that is especially optimal for realizing a zoom lens for use in a medium size camera that favorably corrects the distortion and has a wide picture angle.

The zoom lens of the present invention is different from a general zoom lens having a negative/positive two group composition in that the zoom lens of the present invention does not require lengthening of the back focal length. Conversely, reducing the back focal length is necessary for making it compact. However, in the zoom lens of the present invention and the zoom lens having a general negative/positive two group composition, the principle point of the second lens group G2 is extended in the object direction and the dead space between the first lens group G1 is secured.

According to the present invention, in addition to the internalizing of the above-mentioned negative/positive/negative three group composition, a position that reverses the object-image relationship of the general retro-focus type wide-angle lens may be adopted to the composition of the entire second lens group G2. In this way, a sufficient F number can be secured and the principle point of the second lens group G2 may be positioned further to the object direction. Also, sufficient dead space can be secured. By securing sufficient distance between the front lens subgroup of the second group G2F and the rear lens subgroup of the second group G2R, the separation of the ray height (h, h') at which the ray on the axis and the ray off the axis pass can be sufficiently secured. The aberration that occurs on the axis as well as the aberration that occurs off the axis may be favorably corrected. Therefore, with the front lens subgroup of the second group G2F and with the master portion of the general retro-focus lens, at least three lens components are required including, in order from the object side, a positive lens component L2F1, a negative lens component L2F2 and a positive lens component L2F3. When the front lens subgroup of the second group G2F does not satisfy the above composition, correction of the spherical aberration is insufficient and a sufficient F number may not be secured especially when at the telephoto side.

Furthermore, in a zoom lens where the angle of field is large and sufficient correction of the distortion is required, the rear lens subgroup of the second group G2R, as well as the diverging part of the general retro-focus type lens may require a two lens component including a negative lens component L2Rn and a positive lens component L2Rp.

The first lens group G1, as well as the general negative/positive two group composition zoom lens, requires two lens components of a negative lens component and a positive lens component to correct favorably the lower part of coma and the distortion. In addition, in a zoom lens that has a wide angle of field, a meniscus shape of negative lens component of the first lens group G1 that has a convex surface facing towards the object side has an effect on the correction of the curvature of field and the astigmatism. The first lens group G1 has at least a negative meniscus lens component L1n of which the convex surface faces towards the object side and a positive lens component L1p.

The following Equations (1) and (2) may be satisfied.

$$-3 \leq f2R/fW \leq -1.33 \qquad (1)$$

$$-4 \leq (Rb+Ra)/(Rb-Ra) < -1 \qquad (2)$$

Where, f2R: focal length of the rear lens subgroup of the second group G2R;

fW: focal length of the entire system when in the wide-angle state;

Ra: radius of curvature of the surface of the most object side of the negative meniscus lens component L1n; and Rb: radius of curvature of the surface of the most image side of the negative meniscus lens component L1n.

When the negative meniscus lens component L1n is an aspherical lens, a calculation using the paraxial curvature radius is substituted. When the negative meniscus lens component L1n is a cemented lens, a calculation using the radius of curvature of the surface of the most object side of the cemented lens body and the radius of curvature of the surface of the most image side of the cemented lens body is substituted.

Equation (1) regulates the appropriate range of refractive power of the rear lens subgroup of the second group G2R.

When falling below the lower limit of Equation (1), the negative refractive power of the rear lens subgroup of the second group G2R becomes too weak and the back focal length becomes too long. This is undesirable because it increases the total length as with the general negative/positive two-group composition zoom lens. Moreover, when the lower limit of Equation (1) is set to −2.5, then the aberration correction can be performed more favorably.

On the other hand, when the upper limit of Equation (1) is exceeded, the negative refractive power of the rear lens subgroup of the second group G2R becomes substantially strong and the back focal length becomes short. Thus, it becomes difficult to maintain the large F number (brightness). In addition, when considering aberrations, this is undesirable because the spherical aberration in the telephoto state becomes worse and the distortion becomes even worse.

Moreover, when setting the upper limit to −1.45, the aberration correction can be performed more favorably.

Equation (2) regulates the appropriate range of the shape factor of the negative meniscus lens component L1n that is within the first lens group G1.

When falling below the lower limit of Equation (2), the degree of the meniscus shape becomes substantial and the principal ray separates too much from the optical axis. This may result in an increase in scale of the filter measurement, which is undesirable. In addition, when considering aberrations due to the generation of high-order aberrations, this may worsen the lower part of coma, the astigmatism and the distortion while in the wide angle state. This also is undesirable. Moreover, when setting the lower limit of Equation (2) to −3, the small scale and the high performance are additionally enhanced.

On the other hand, when exceeding the upper limit of Equation (2), the negative meniscus lens component L1 becomes a plano-concave lens shape. When the value of the shape factor changes in the positive direction, it changes into a biconcave lens shape. This results in a larger angle of deviation a against the peripheral luminous flux and the aberration generation amount increases. The curvature of field and the astigmatism that occur in the wide angle state also becomes worse and the lower part of coma that occurs at each state of focal length becomes worse. This is undesirable.

Furthermore, it may also be desirable to satisfy the following Equation (3).

$$0.1 \leq DFR/DG2 \leq 0.6 \qquad (3)$$

Where,

DFR: the air spacing on the axis between the front lens subgroup of the second group G2F and the rear lens subgroup of the second group G2R; and DG2: the total thickness on the axis from the lens surface of the most object side of the second lens group G2 until the lens surface of the most image side of the second lens group G2.

Equation (3) regulates the appropriate range of the air spacing on the axis between the front lens subgroup of the second group G2F and the rear lens subgroup of the second group G2R. The air spacing DFR on the axis remaining within the appropriate range is a necessary condition for favorably correcting the on-axis aberrations and the off-axis aberrations.

When falling below the lower limit of Equation (3), the separation of the front lens subgroup of the second group G2F and the rear lens subgroup of the second group G2R is insufficient because the air spacing DFR on the axis becomes substantially small. Further, the correction of the on-axis aberrations and off-axis aberrations are no longer compatible. Thus, the lower part of coma, the curvature of field and the astigmatism become worse. Moreover, when setting the lower limit of Equation (3) to 0.27, it may be possible to correct the aberrations more favorably.

On the other hand, when exceeding the upper limit of Equation (3), the air spacing DFR on the axis becomes substantially large and the rear lens diameter increases as the total length becomes larger. This is undesirable. Moreover, when setting the upper limit of Equation (3) to 0.5, the additional small scale can be realized.

In addition, it may be desirable to satisfy the following Equation (4).

$$0.6 \leq |f1|/(fW \cdot fT)^{1/2} \leq 1.3 \qquad (4)$$

Where, f1: the focal length of the first lens group G1; and fT: the focal length of the entire system when in the wide-angle state.

Equation (4) regulates the conditions that relate to the refractive power of the first lens group G1. When the value of Equation (4) is 1.0, the total length variation due to zooming will be minimized and the total length of the wide angle state equals the total length of the telephoto state. In addition, when the value of Equation (4) becomes larger than 1.0, the total length when in the wide angle state is extremely long. When the value of Equation (4) is smaller than 1.0, the total length when in the telephoto state is extremely long.

When falling below the lower limit of Equation (4), the spherical aberration and the lower part of coma that occur in the telephoto state becomes difficult to correct. Moreover, when setting the lower limit of Equation (4) to 0.7, or more favorably setting it to 0.8, the aberration correction becomes even more appropriate.

On the other hand, when exceeding the upper limit of Equation (4), the principal ray that occurs in the wide angle state separates too much from the optical axis. Also the front lens diameter increases and the scale of the total length increases. This is undesirable. Moreover, when setting the upper limit of Equation (4) to 1.2, or more favorably to 1.1, an additionally compact zoom lens can be realized.

In addition, it may be desirable to satisfy the following Equation (5).

$$0.65 \leq f2/fW \leq 1.1 \qquad (5)$$

Where, f2: the focal length of the second lens group G2.

Equation (5) regulates the refractive power of the second lens group G2.

When falling below the lower limit of Equation (5), the refractive power of the second lens group G2 becomes too strong and the spherical aberration and the lower part of coma that occur in the telephoto state become difficult to correct. Moreover, when setting the lower limit of Equation (5) to 0.75, the aberration correction can be more favorably achieved.

On the other hand, when exceeding the upper limit of Equation (5), the refractive power of the second lens group G2 becomes too weak and the total length variation becomes large. This may increase the scale of the total length. This is undesirable. Moreover, when setting the upper limit of Equation (5) to 1.0, an additional compactness may be achieved.

In addition, it may be desirable to satisfy the following Equation (6).

$$-15 \leq vn - vp \leq 10 \qquad (6)$$

Where, vn: the Abbe number of the negative lens component L2Rn that is within the rear lens subgroup of the second group G2R; and vp: the Abbe number of the positive lens component L2Rp that is within the rear lens subgroup of the second group G2R.

Equation (6) regulates the appropriate range of the difference between the negative lens component L2Rn and the Abbe number of the positive lens component L2Rp that are within the rear lens subgroup of the second group G2R. Equation (6) will be explained referring to an example of corrective chromatic aberration in a general retro-focus type lens.

For example, with a retro-focus lens of a positive/negative/positive/positive/negative/positive six lens composition in order to sufficiently suppress the fluctuations of the lateral chromatic aberration that coincide with the generation of such lateral chromatic aberration and the angle of field, it is desirable to have a composition including two lenses on the object side such as both a positive lens and a negative lens from an optical material (i.e., glass) that has an extra low dispersement.

A reverse arrangement of the object image relationship of the general retro-focus type lens may be adopted as the composition of the second lens group rear group G2R. Thus, it may be desirable to use an optical material of a relatively low dispersement in the negative lens component L2Rn and the positive lens component L2Rp that is within the rear lens subgroup of the second group G2R. It may also be desirable that the dispersement difference of the two lens components are small.

When falling below the lower limit of Equation (6), the Abbe number of the negative lens component L2Rn becomes substantially small (high dispersement) when using the Abbe number of the positive lens component L2Rp as a standard. It becomes impractical to favorably maintain the correction of the chromatic aberration and especially the lateral chromatic aberration. Moreover, when setting the lower limit of Equation (6) to −10, or more favorably to −8.5, then the aberration correction can be achieved more favorably.

On the other hand, when exceeding the upper limit of Equation (6), the positive lens component L2Rp has a substantially high dispersement when using the Abbe number of the negative lens component L2Rn as a standard. It therefore becomes impossible to favorably correct especially the lateral chromatic aberration. Conversely, when considering the Abbe number of the positive lens component L2Rp as the standard, the negative lens component L2Rn becomes a substantially low dispersement. Currently, this type of low refractivity glass material is generally only used in a negative lens component L2Rn made for low dispersement. This results in the curvature of field, the astigmatism and the lower part of coma becoming worse especially when in the wide angle state. This is undesirable. Moreover, when setting the upper limit of Equation (6) to 8.5, the aberration correction may be achieved more favorably.

In addition, it may be desirable to satisfy the following Equation (7).

$$-0.05 \leq nn - np \leq 0.2 \tag{7}$$

Where, nn: the refractivity against the d line of the negative lens component L2Rn from within the rear lens subgroup of the second group G2R; and np: the refractivity against the d line of the positive lens component L2Rp from within the rear lens subgroup of the second group G2R.

Equation (7) regulates the appropriate range for the refractivity of the negative lens component L2Rn and the positive lens component L2Rp that are within the rear lens subgroup of the second group G2R.

When falling below the lower limit of Equation (7), the refractivity of the positive lens component L2Rp becomes substantially large compared to the refractivity of the negative component L2Rn. For this reason, the Petzval sum is too small, and the curvature of field and astigmatism become worse. This in undesirable. Moreover, when setting the lower limit of Equation (7) to −0.02, then the aberration correction can be more favorably achieved.

On the other hand, when exceeding the upper limit of Equation (7), the rim thickness is reduced because the radius of the curvature of the positive lens component L2Rp becomes too small. This is undesirable because inconveniences occur during manufacturing.

Furthermore, the angle of inclination α' against the oblique ray also becomes substantially large. This may cause high order aberration generation, which is undesirable. Moreover, when setting the upper limit of Equation (7) to 0.1, then the efficacy may be more favorably demonstrated.

It may also be desirable to satisfy the following Equation (8).

$$0.1 \leq Bf/y \leq 1.5 \tag{8}$$

Where,

Bf: the back focal length in the wide-angle state; and y: the maximum image height.

Equation (8) regulates the appropriate range for the back focal length that occurs in the wide angle state. With a zoom lens for a range finder camera rather than a zoom lens for a single reflex camera, a back focal length that is shorter than a predetermined length is necessary for compactness.

When falling below the lower limit of Equation (8), the back focal length becomes too short and the possibility increases that the mechanical components at the camera side will interfere with the lens barrel. In addition, the lens on the most image side is optically too close to the focal plane (image plane). This is undesirable because the possibility increases for dust attached to the lens surface or a scratch on the lens surface to appear on the image. Moreover, when setting the lower limit of Equation (8) to 0.2, then the interference and appearance can be favorably avoided.

On the other hand, when exceeding the upper limit of Equation (8), the back focal length becomes substantially long and the total length becomes substantially long. This is undesirable because it goes against compactness. Moreover, when setting the upper limit of Equation (8) to 1.0, then a compact zoom lens may be more easily realized.

In addition, when considering the cost-performance and compactness, the rear lens subgroup of the second group G2R may include two lens components of a negative meniscus lens L2Rn having the convex surface face towards the image side and a positive lens L2Rp.

In addition, the positive lens component L2F3 that is within the front lens subgroup of the second group G2F may have at least two positive lens components to correct the lower part of coma and the spherical aberration that occurs when in the state of each focal length.

In addition, when considering the symmetry of the entire system, the aperture diaphragm A may be arranged in the front lens subgroup of the second group G2F or in the front and rear of such.

Furthermore, by introducing an aspherical surface to the lens surface that is within the first lens group G1 and the rear lens subgroup of the second group G2R, it may be possible to increase the zoom ratio as well as more favorably correct the distortion, the curvature of field, the coma and so forth. In addition, by introducing an aspherical surface to the lens surface that is within the front lens subgroup of the second group G2F, it may be possible to achieve a larger aperture diameter. In addition, by attaching a new lens group to the first lens group G1 as well as the second lens group G2, it may be possible to increase the zoom ratio.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals refer to like elements and wherein:

FIGS. 2A–2I show the aberrations that occur in the wide angle state of the first embodiment;

FIGS. 8A–8I show the aberrations that occur in the telephoto state of the second embodiment.

DETAILED DESCRIPTION OF PREFERRED EMBODIMENTS

An explanation of each of embodiments of the present invention is provided with reference to the attached drawings.

The zoom lens that relates to each embodiment of the present invention provides, in order from the object side, a first lens group G1 of negative refractive power and a second lens group G2 of positive refractive power. The zoom lens performs zooming by changing the air spacing between the first lens group G1 and the second lens group G2. Moreover, the second lens group G2 has, in order from the object side, a front lens subgroup G2F of positive refractive power, and a rear lens subgroup G2R of negative refractive power.

Figure 1A:
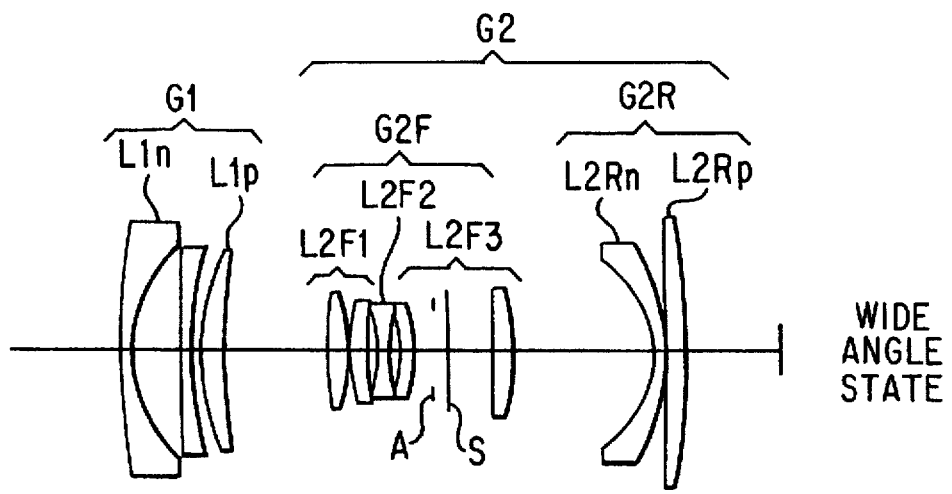
FIGS. 1A–1C show the movement of each lens group during zooming from the wide angle state to the telephoto state of the first embodiment.
Figure 1B:
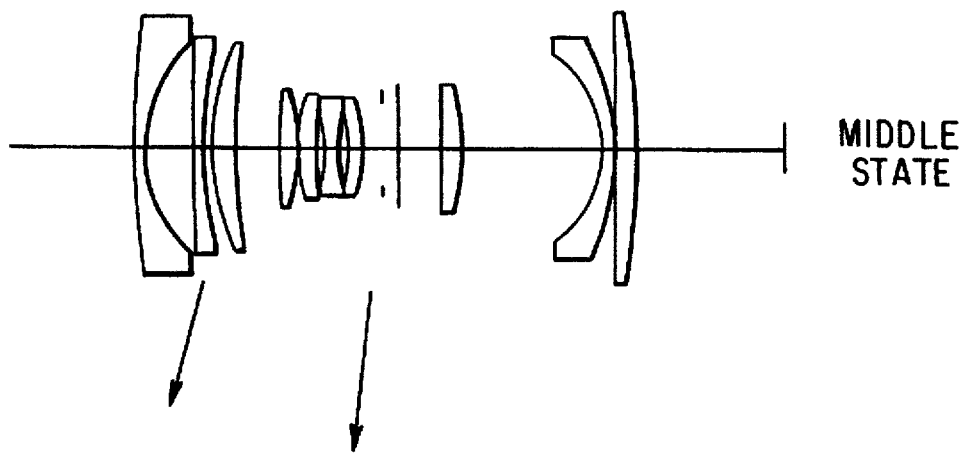
Figure 1C:
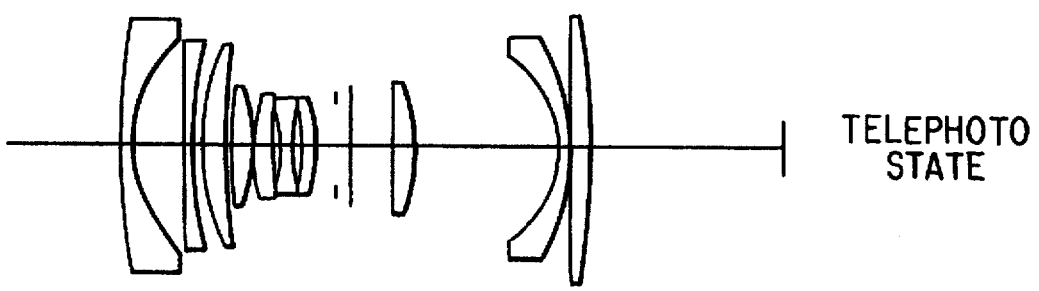
Figure 2A:
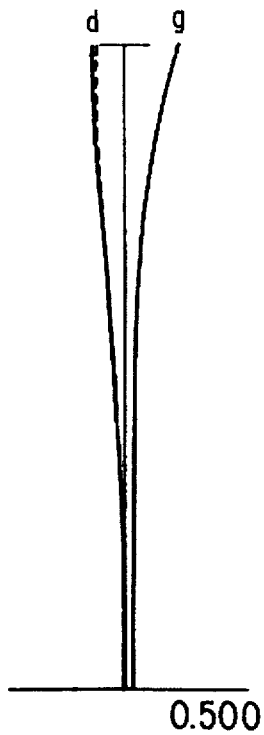
Figure 2B:
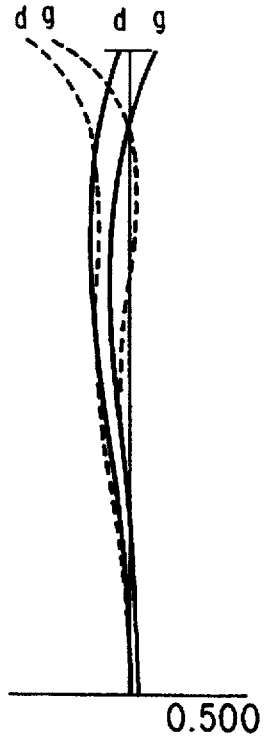
Figure 2C:
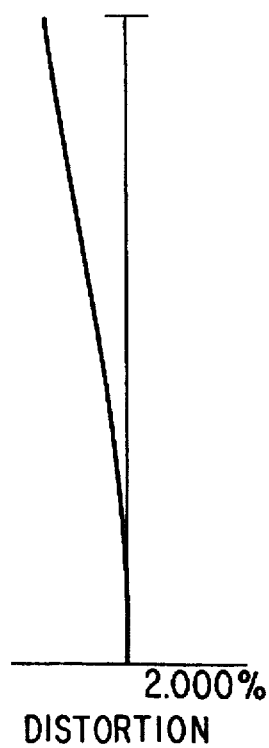
Figure 2D:
Figure 3A:
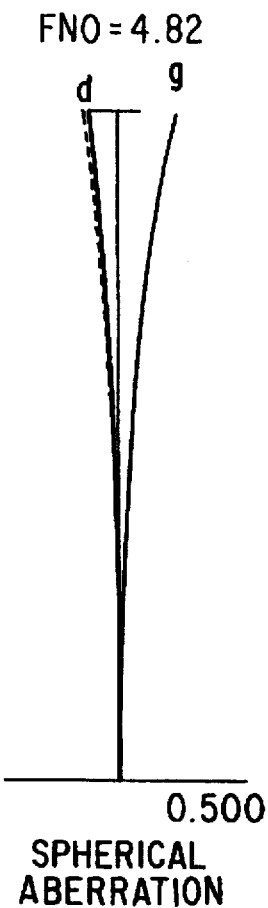
FIGS. 3A–3I show the aberrations that occur in the state of middle focal length of the first embodiment.
Figure 3B:
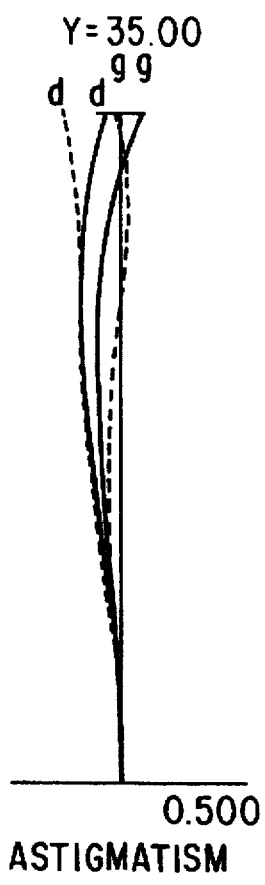
Figure 3C:
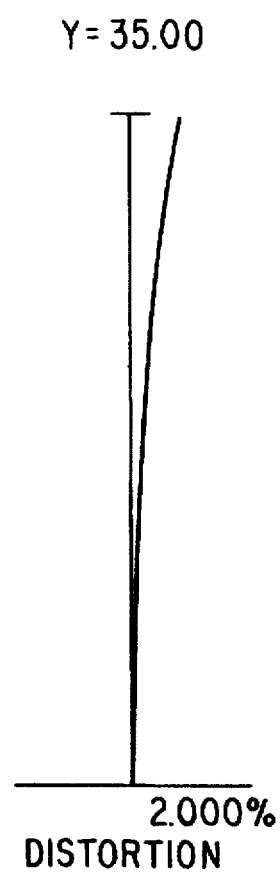
Figure 3D:
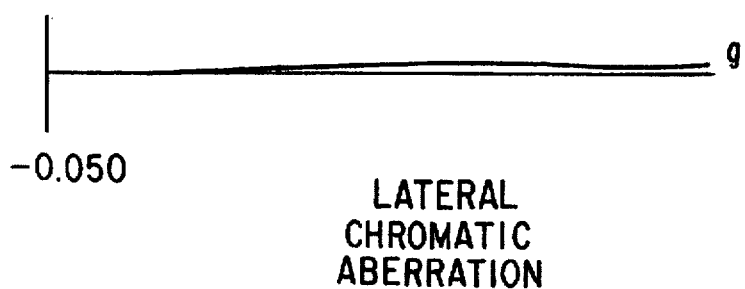
Figure 3E:
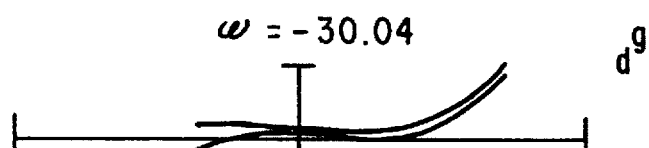
Figure 3F:
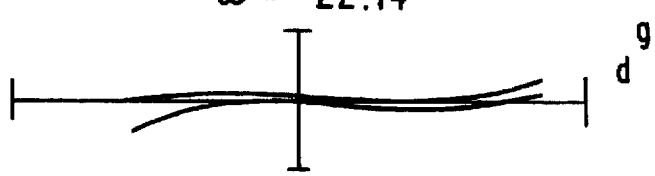
Figure 3G:
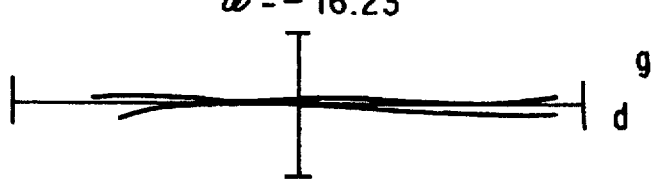
Figure 3H:
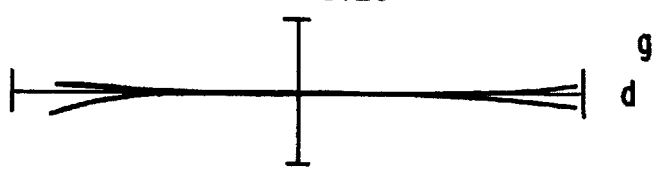
Figure 3I:
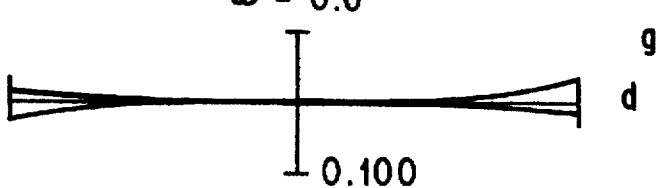
Figure 4A:
FIGS. 4H–4I show the aberrations that occur in the telephoto state of the first embodiment.
Figure 4B:
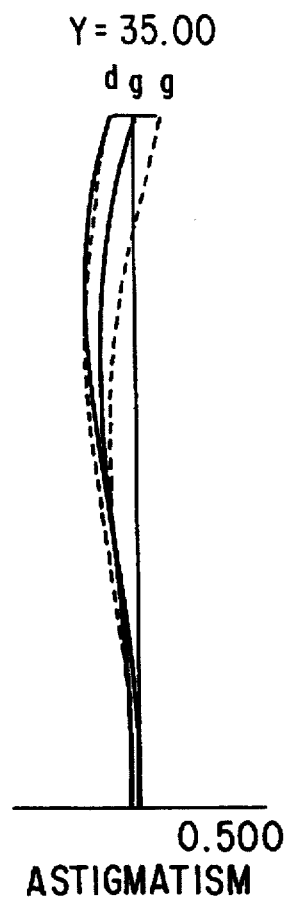
Figure 4C:
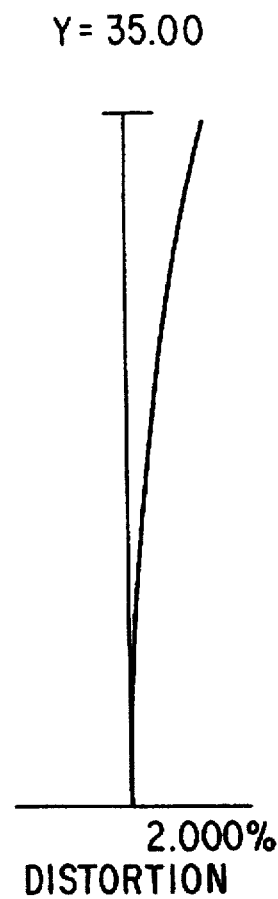
Figure 4D:
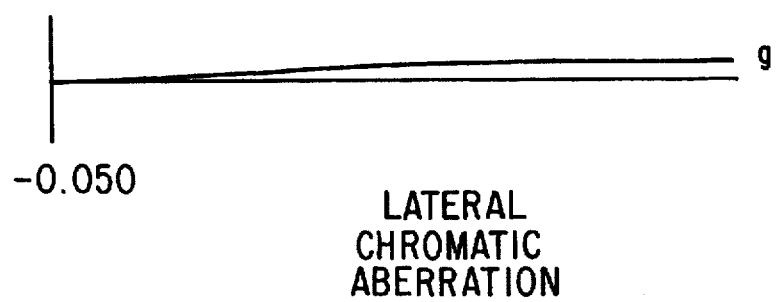

FIGS. 1A–1C show the elements of movement of each lens group during zooming from the wide angle state to the telephoto state.

In the zoom lens of FIGS. 1A–1C, the first lens group G1 includes, in order from the object side, a negative meniscus lens L1n having the convex surface facing the object side and a negative meniscus lens having the convex surface facing the object side and a positive meniscus lens L1p having the convex surface facing towards the object side.

The first lens subgroup of the second group G2F includes, in order from the object side, a positive lens component L2F1 comprising a biconvex lens and a positive meniscus lens having the convex surface facing towards the object side, and a negative lens component L2F2 comprising a biconcave lens, and a positive lens component L2F3 comprising a positive meniscus lens having the concave surface facing towards the object side and a positive meniscus lens having the concave surface facing towards the object side. An aperture diaphragm A and a fixed diaphragm S are also arranged within the positive lens component L2F3.

The rear lens subgroup of the second group G2R includes, in order from the object side, a negative meniscus lens having the convex surface facing towards the image side and a positive meniscus lens having the concave surface facing towards the object side.

Moreover, during zooming from the wide angle state to the telephoto state, the first lens group G1 and the second lens group G2 each move along the orbit shown by the arrow between FIGS. 1A–1C. In addition, by moving the entire body of the first lens group along the optical axis, the zoom lens performs focusing of a near distance object.

Table (1) gives the values of the items of one embodiment of the present invention. In this Table, f indicates the focal length, F NO indicates the F number, $2\omega$ indicates the angle of field, Bf indicates the back focal length, $\beta$ indicates the photographic imaging magnification and D0 indicates the distance of the object. In addition, the surface number indicates the order of the lens surface from the object side proceeding along in the direction of the ray. Further the refractivity indicates a value against the d line ($\lambda$=587.6 nm).

TABLE 1 f = 46.3–72.8
f NO = 4.09–5.5
$2\omega$ = 75.06–50.76°

| Surface Number | Radius of Curvature | Plane Spacing | Abbe Number | Refractivity |
|---|---|---|---|---|
| 1 | 152.6938 | 2.0000 | 45.37 | 1.796681 |
| 2 | 27.4491 | 9.0000 | | |
| 3 | 763.5595 | 2.0000 | 49.45 | 1.772789 |
| 4 | 87.4890 | 1.9500 | | |
| 5 | 43.7638 | 4.5000 | 25.50 | 1.804581 |
| 6 | 147.3041 | (d6 = variable) | | |
| 7 | 94.9146 | 3.3000 | 58.54 | 1.612720 |
| 8 | −47.9371 | 0.1000 | | |
| 9 | 33.9272 | 4.1000 | 61.09 | 1.589130 |
| 10 | 3625.2475 | 1.3000 | | |
| 11 | −41.7168 | 2.5000 | 28.56 | 1.795040 |
| 12 | 95.4478 | 1.4000 | | |
| 13 | −51.9798 | 2.5000 | 64.10 | 1.516800 |
| 14 | −27.7921 | 4.0000 | | |
| 15 | ∞ | 2.5000 | (Aperture diaphragm A) | |

TABLE 1-continued f = 46.3–72.8
f NO = 4.09–5.5
$2\omega$ = 75.06–50.76°

| Surface Number | Radius of Curvature | Plane Spacing | Abbe Number | Refractivity |
|---|---|---|---|---|
| 16 | ∞ | 8.0000 | (Fixed diaphragm S) | |
| 17 | −546.7999 | 4.0000 | 64.10 | 1.516800 |
| 18 | −44.4630 | 26.4000 | | |
| 19 | −20.4727 | 2.0000 | 45.37 | 1.796681 |
| 20 | −42.1461 | 0.1000 | | |
| 21 | −1444.5685 | 3.8000 | 49.45 | 1.772789 |
| 22 | −160.1400 | Bf | | |

(Spacing variations that occur in zooming)

| | Wide Angle State | Middle distance focal point | Telephoto state |
|---|---|---|---|
| f | 46.30000 | 60.00000 | 72.80000 |
| D0 | ∞ | ∞ | ∞ |
| d6 | 19.70929 | 8.60120 | 2.00066 |
| Bf | 17.75370 | 26.32545 | 34.33410 |

(Spacing variations that occur in focusing action with a fixed imaging magnification)

| | | | |
|---|---|---|---|
| $\beta$ | −0.03333 | −0.03333 | −0.03333 |
| D0 | 1325.8032 | 1736.8024 | 2120.8024 |
| d6 | 22.30108 | 10.60120 | 3.64901 |
| Bf | 17.76008 | 26.33182 | 34.34047 |

(Spacing variations that occur in focusing action with a fixed focal object distance)

| | | | |
|---|---|---|---|
| $\beta$ | −0.07331 | −0.09500 | −0.11527 |
| D0 | 568.3811 | 568.3811 | 568.3811 |
| d6 | 25.40929 | 14.30120 | 7.70066 |
| Bf | 17.78472 | 26.37756 | 34.41085 |

(Values corresponding to the conditions)

(1) f2R/fW=−1.48
(2) (Rb+Ra)/(Rb−Ra)=−1.44
(3) DFR/DG2=0.40
(4) |f1|/(fW·fT)$^{1/2}$=1.03
(5) f2/fW=0.811
(6) vn−vp=−4.08
(7) nn−np=0.02389
(8) Bf/y=0.507

FIGS. 3A–4I show item aberrations of one embodiment. FIGS. 2A–2I show item aberrations that occur in the wide angle state (i.e., a state of shortest focal length) while FIGS. 3A–3I show item aberrations that occur in the state of middle focal length and FIG. 4 shows item aberrations that occur in the telephoto state (i.e., a state of the longest focal length).

With each aberration figure, the F NO indicates the F number, the Y indicates the image height, the $\omega$ indicates the half angle of field, the d indicates the d line ($\lambda$=587.6 nm) and g indicates the g line ($\lambda$=435.8 nm).

In addition, in the aberration figures showing the astigmatism, the solid line indicates the sagittal image plane and the broken line indicates the medional image plane. Furthermore, in the spherical aberration figures, the broken line indicates the sine condition.

It is understood that all the aberrations are favorably corrected in each of the focal length states.

FIGS. 5A–5I show the elements of movement of each lens group during zooming from the wide angle state to the telephoto state in another embodiment of the present invention.

In FIGS. 5A–5I, the first lens group G1 includes, in order from the object side, a negative meniscus lens L1n having the convex surface facing towards the object side and a positive meniscus lens L1p having the convex surface facing towards the object side.

The front lens subgroup of the second group G2F includes, in order from the object side, a positive lens component L2F1 having a biconvex lens and a biconvex lens, a negative lens component L2F2 having a biconcave lens and a positive lens component L2F3 having a positive meniscus lens with the concave surface facing towards the object side and a positive meniscus lens having the concave surface facing towards the object side. Furthermore, an aperture diaphragm A is arranged within the positive lens component L2F3.

The rear lens subgroup of the second group G2R includes, in order from the object side, a negative meniscus lens having the convex surface facing towards the image side and a biconvex lens.

Figure 5A:
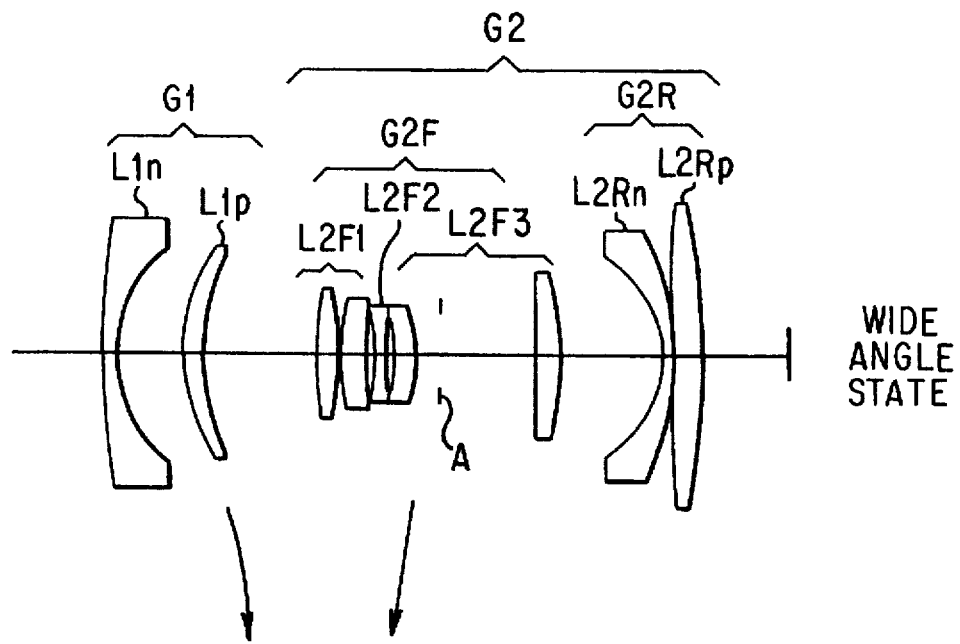
FIGS. 5A–5C show the movement of each lens group during zooming from the wide angle state to the telephoto state of the second embodiment.
Figure 5B:
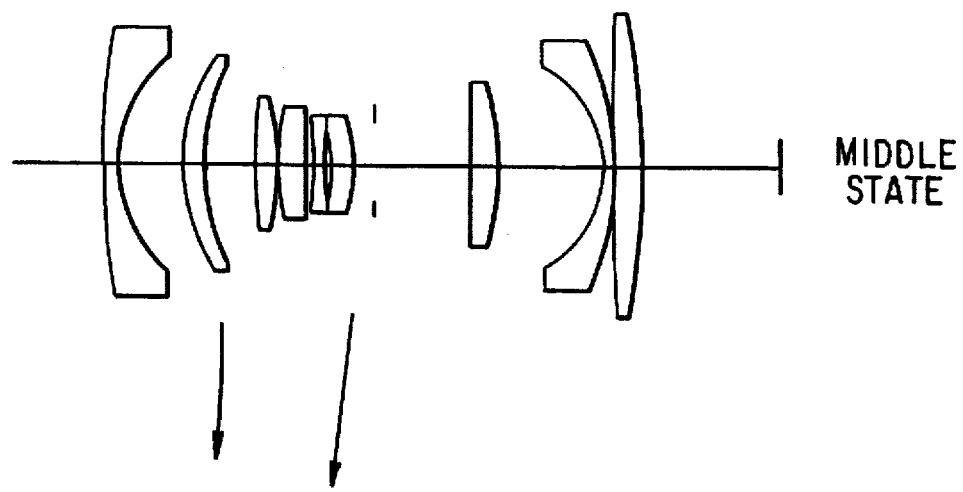
Figure 5C:
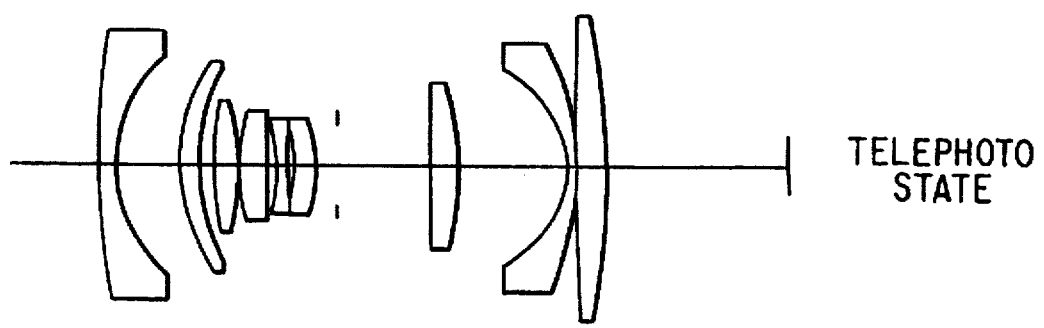
Figure 6A:
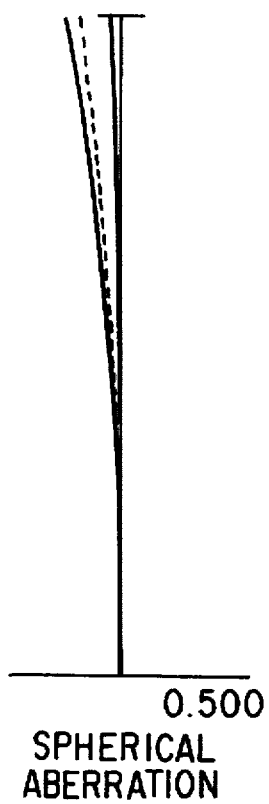
FIGS. 6A–6I show the aberrations that occur in the wide angle state of the second embodiment.
Figure 6B:
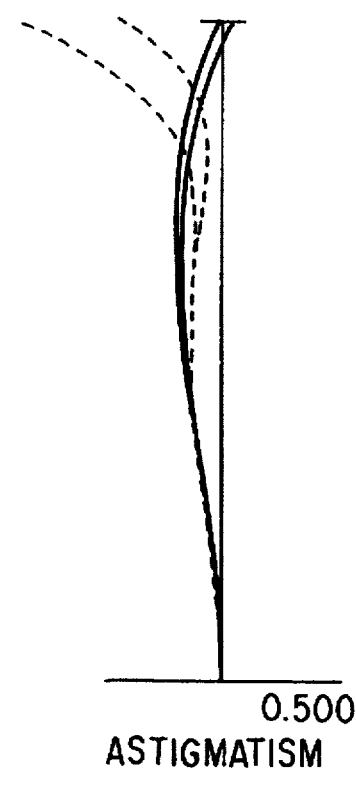
Figure 6C:
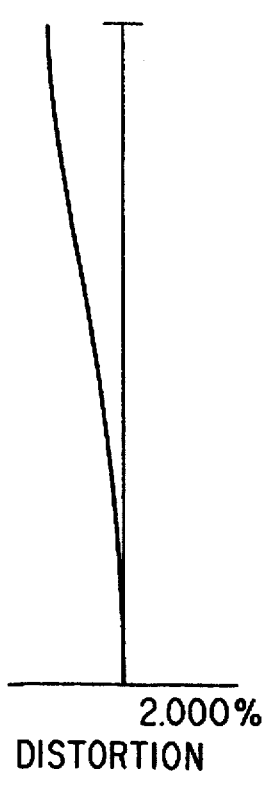
Figure 6D:
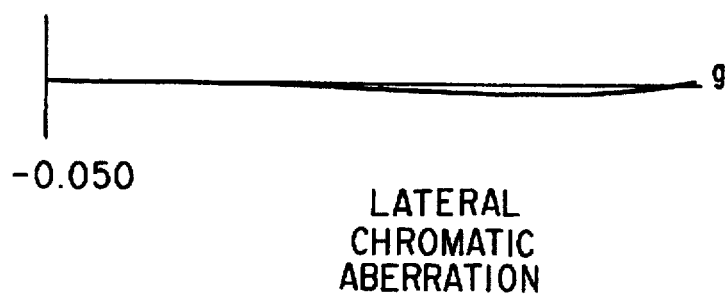
Figure 6E:
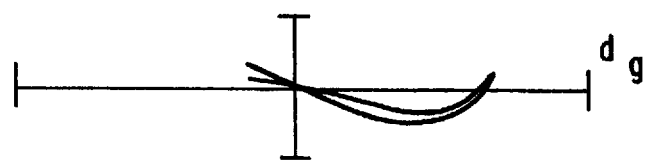
Figure 6F:
Figure 6G:
Figure 6H:
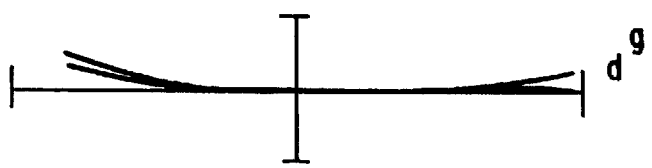
Figure 6I:
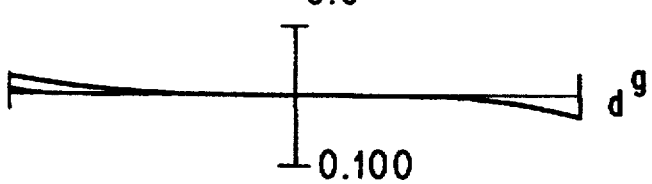
Figure 7A:
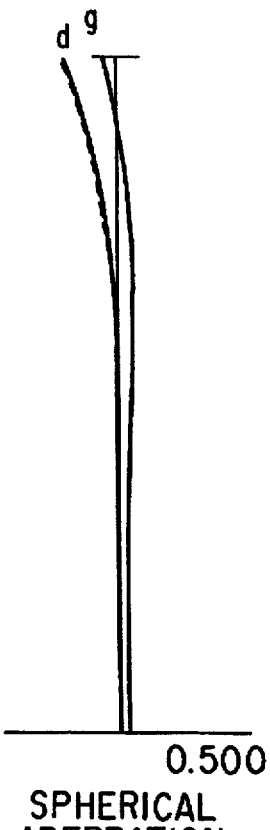
FIGS. 7A–7I show the aberrations that occur in the state of middle focal length of the second embodiment.
Figure 7B:
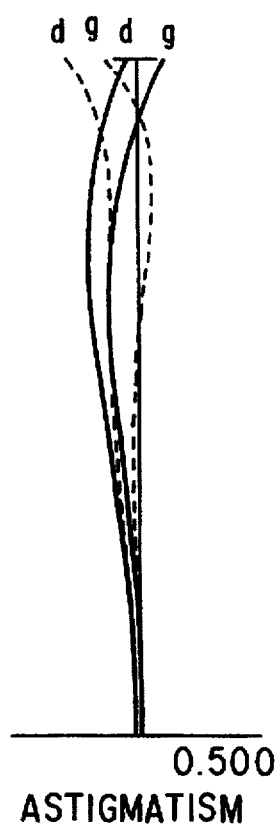
Figure 7C:
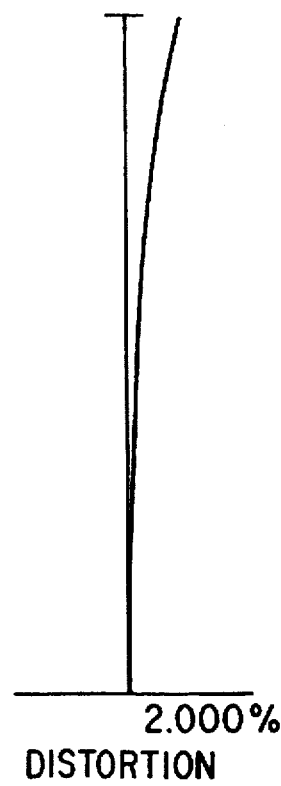
Figure 7D:
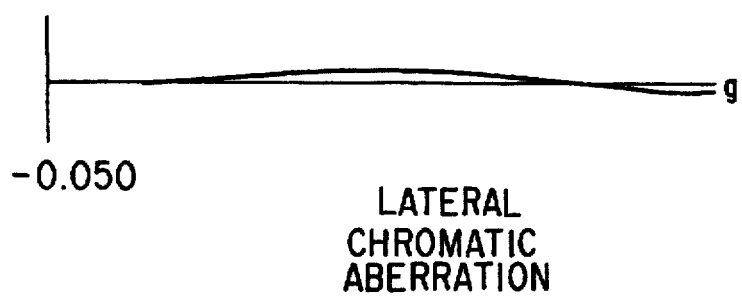
Figure 7E:
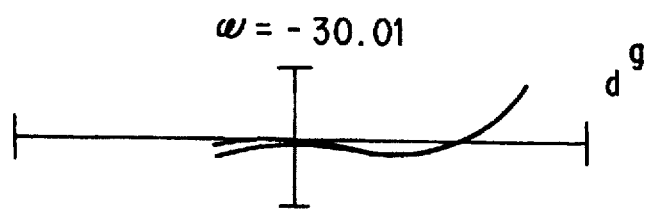
Figure 7F:
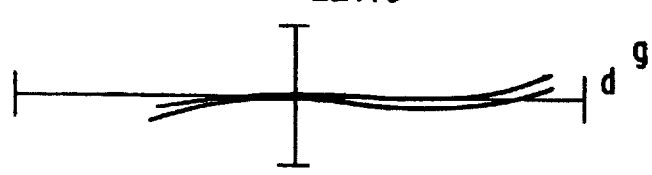
Figure 7G:
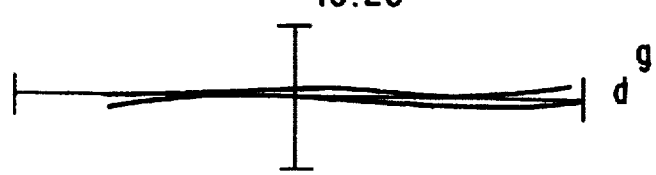
Figure 7H:
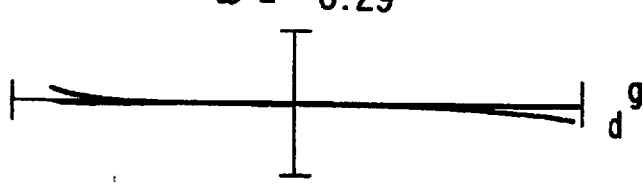
Figure 7I:
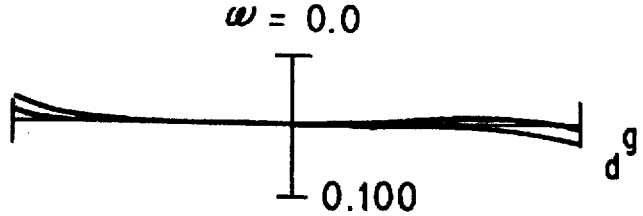
Figure 8A:
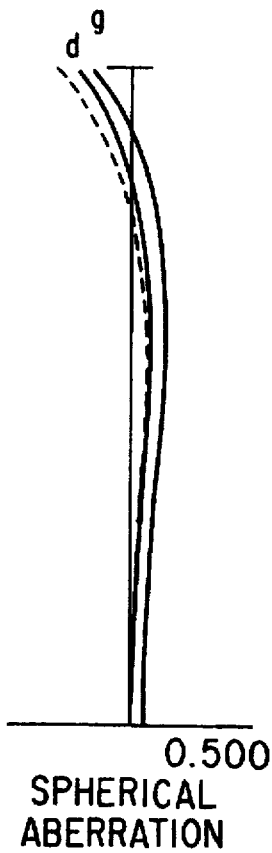
Figure 8B:
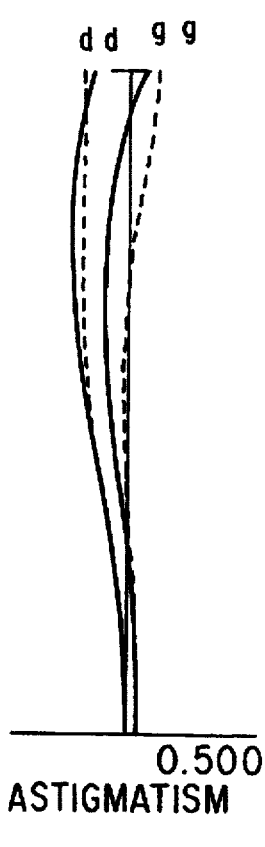
Figure 8C:
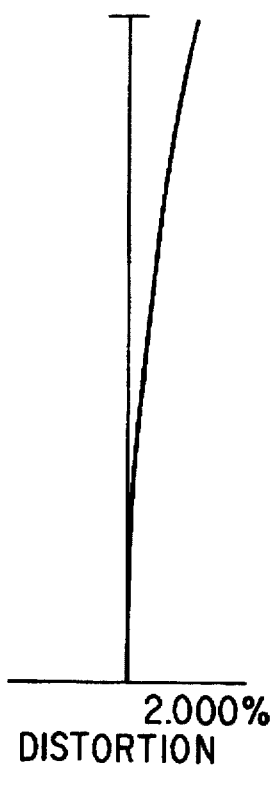
Figure 8D:
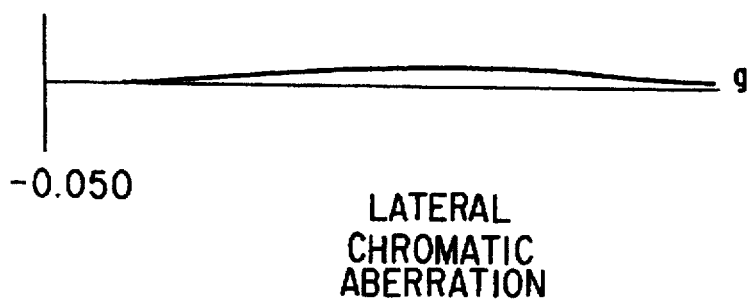

Moreover, during zooming from the wide angle state to the telephoto state, the first lens group G1 and the second lens group G2 each move along the orbit shown by the arrow between FIGS. 5A–5C. In addition, by moving the entire body of the first lens group along the optical axis, the zoom lens performs focusing of a near distance object.

Table (2) gives the values of this embodiment. In this Table, f indicates the focal length, F NO indicates the F number, 2ω indicates the angle of field, Bf indicates the back focal length, β indicates the photographic imaging magnification and D0 indicates the distance of the object. In addition, the surface number indicates the order of the lens surface from the object side proceeding along in the direction of the ray and the refractivity indicates a value corresponding to the d line (λ=587.6 nm).

TABLE 2 f = 46.3–72.8
f NO = 4.14–5.57
2ω = 72.02–50.8°

| Surface Number | Radius of Curvature | Plane spacing | Abbe Number | Refractivity |
|---|---|---|---|---|
| 1 | 180.6731 | 2.0000 | 52.30 | 1.748099 |
| 2 | 25.7624 | 12.4000 | | |
| 3 | 31.9892 | 3.5000 | 23.01 | 1.860741 |
| 4 | 40.9794 | (d4 = variable) | | |
| 5 | 92.3941 | 4.0000 | 58.54 | 1.612720 |
| 6 | −48.2802 | 0.1000 | | |
| 7 | 34.5105 | 5.0000 | 61.09 | 1.589130 |
| 8 | −379.0352 | 1.3000 | | |
| 9 | −42.9964 | 2.0000 | 28.56 | 1.795040 |
| 10 | 98.1840 | 1.2000 | | |
| 11 | −69.3931 | 4.0000 | 64.10 | 1.516800 |
| 12 | −29.0307 | 4.0000 | | |
| 13 | ∞ | 15.8000 | (Aperture diaphragm A) | |
| 14 | −566.3384 | 4.3000 | 64.10 | 1.516800 |
| 15 | −65.4513 | 18.9500 | | |
| 16 | −20.6498 | 2.0000 | 45.37 | 1.796681 |
| 17 | −45.7446 | 0.1000 | | |
| 18 | 1938.5950 | 4.8000 | 40.90 | 1.796310 |
| 19 | −118.6370 | Bf | | |

(Spacing variations that occur in zooming)

| | Wide Angle State | Middle distance focal point | Telephoto state |
|---|---|---|---|
| f | 46.30000 | 60.00000 | 72.80000 |
| D0 | ∞ | ∞ | ∞ |
| d6 | 19.70693 | 8.59884 | 1.99830 |
| Bf | 15.45820 | 24.02995 | 32.03860 |

(Spacing variations that occur in focusing action with a fixed photographic imaging magnification)

| | | | |
|---|---|---|---|
| β | −0.03333 | −0.03333 | −0.03333 |
| D0 | 1324.6773 | 1735.6782 | 2119.6766 |
| d4 | 22.29872 | 10.59884 | 3.64665 |
| Bf | 15.46458 | 24.03631 | 32.04497 |

(Spacing variations that occur in focusing action with a fixed focal object distance)

| | | | |
|---|---|---|---|
| β | −0.07267 | −0.09417 | −0.11426 |
| D0 | 572.8445 | 572.8445 | 572.8445 |
| d4 | 25.35693 | 14.24884 | 7.64830 |
| Bf | 15.48868 | 24.08114 | 32.11400 |

(Values corresponding to the conditions)

(1) f2R/fW=−1.71
(2) (Rb+Ra)/(Rb−Ra)=−1.33
(3) DFR/DG2=0.281
(4) |f1|/(fW·fT)$^{1/2}$=1.03
(5) f2/fW=0.811
(6) vn−vp=4.47
(7) nn−np=0.00037
(8) Bf/y=0.442

FIGS. 6A–6I show item aberrations of the second embodiment. Furthermore, FIG. 6 shows item aberrations that occur in the wide angle state, FIGS. 7A–7I show item aberrations that occur in the state of middle focal length and FIGS. 8A–8I show item aberrations that occur in the telephoto state.

With each aberration figure, F NO indicates the F number, Y indicates the image height, ω indicates the half angle of field, d corresponds to the d line (λ=587.6 nm), and g corresponds to the g line (λ=435.8 nm).

In addition, in the aberration figures that show the astigmatism, the solid line indicates the sagittal image plane and the broken line indicates the medional image plane. Furthermore, in the aberration figures showing the spherical aberration, the broken line indicates the sine condition.

It is understood that all the aberrations are favorably corrected in each of the focal length states.

The above embodiments describe examples of a compact zoom lens for a medium size camera. However, the present invention also applies to zoom lenses used in other format cameras as well as video cameras.

In addition, with each of the embodiments described above, by decentering the entire front second lens subgroup of the second group G2F in relation to the optical axis or the portion of the front lens subgroup of the second group arranged at the object side further than the aperture diaphragm A, vibrations in the image position caused by hand shaking can be corrected.

In addition, each of the above embodiments adopts a front lens (dispersing) focusing method that performs focusing by moving the entire first lens group G1. However an inner focusing method is also possible that performs focusing by moving the front lens subgroup of the second group G2F.

While the invention has been described in relation to preferred embodiments, many modifications and variations are apparent from the description of the invention, and all such modifications and variations are intended to be within the scope of the present invention as defined in the appended claims.

What is claimed is:

1. A zoom lens system comprising from an object to an image side:
   a first lens group of negative refractive power including at least a negative lens component and a positive lens component arranged closer to the image side than the negative lens component; and
   a second lens group including, from the object to the image side, a front lens subgroup including, from the object to the image side, at least a first lens component of positive refractive power, a second lens component of negative refractive power separated from said first lens component with air spacing, and a third lens component of positive refractive power separated from said second lens component with air spacing, and a rear lens subgroup including at least a negative lens component and a positive lens component, wherein the zoom lens system performs zooming operation by changing an air spacing between the first lens group and the second lens group, and a focal length f2R of the rear lens subgroup of the second group and a focal length fW of the entire system in a wide-angle state satisfy
   $-3 < f2R/fW \leq -1.33$.

2. The zoom lens system of claim 1, wherein a radius of curvature Ra of a surface of the object side of the negative lens component of the first lens group and a radius of curvature Rb of a surface of the image side of the negative lens component of the first lens group satisfy
   $-4 \leq (Rb+Ra)/(Rb-Ra) < -1$.

3. The zoom lens system of claim 2, wherein the air spacing DFR on the optical axis between the front lens subgroup of the second group and the rear lens subgroup of the second group and a total thickness on the optical axis from the lens surface of the object side of the second lens group until the lens surface of the image side of the second lens group satisfy
   $0.1 \leq DFR/DG2 \leq 0.6$.

4. The zoom lens system of claim 3, wherein a focal length f1 of the first lens group, the focal length fW of the entire system when in the wide-angle state and a focal length fT of the entire system when in the telephoto state satisfy
   $0.6 \leq |f1|/(fW \cdot fT)^{1/2} \leq 1.3$.

5. The zoom lens system of claim 4, wherein a focal length f2 of the second lens group and the focal length fW of the entire system when in the wide-angle state satisfy
   $0.65 \leq f2/fW \leq 1.1$.

6. The zoom lens system of claim 5, wherein an Abbe number vn of the negative lens component from within the rear lens subgroup of the second group and an Abbe number vp of the positive lens component from within the rear lens subgroup of the second group satisfy
   $-15 \leq vn-vp \leq 10$.

7. The zoom lens system of claim 6, wherein a refractivity nn against a d line of the negative lens component from within the rear lens subgroup of the second group and a refractivity np against a d line of the positive lens component from within the rear lens subgroup of the second group satisfy $-0.05 \leq nn-np \leq 0.2$.

8. The zoom lens system of claim 7, wherein a back focal length Bf in the wide-angle state and a maximum image height y satisfy
   $0.1 \leq Bf/y \leq 1.5$.

9. The zoom lens system of claim 8, wherein the negative lens component of the rear lens subgroup of the second group has a convex surface facing towards the object side.

10. The zoom lens system of claim 9, wherein the second positive lens component within the front lens subgroup of the second group includes at least two positive lens elements.

11. The zoom lens system of claim 10, wherein the first positive lens component within the front lens subgroup of the second group includes at least two positive lens elements.

12. The zoom lens system of claim 1, wherein the air spacing DFR on the optical axis between the front lens subgroup of the second group and the rear lens subgroup of the second group and a total thickness on the optical axis from the lens surface of the object side of the second lens group until the lens surface of the image side of the second lens group satisfy
    $0.1 \leq DFR/DG2 \leq 0.6$.

13. The zoom lens system of claim 1, wherein a focal length f1 of the first lens group, the focal length fW of the entire system when in the wide-angle state and a focal length fT of the entire system when in the telephoto state satisfy
    $0.6 \leq |f1|/(fW \cdot fT)^{1/2} \leq 1.3$.

14. The zoom lens system of claim 1, wherein a focal length f2 of the second lens group and a focal length fW of the entire system when in the wide-angle state satisfy
    $0.65 \leq f2/fW \leq 1.1$.

15. The zoom lens system of claim 1, wherein an Abbe number vn of the negative lens component from within the rear lens subgroup of the second group and an Abbe number vp of the positive lens component from within the rear lens subgroup of the second group satisfy
    $-15 \leq vn-vp \leq 10$.

16. The zoom lens system of claim 1, wherein a refractivity nn against a d line of the negative lens component from within the rear lens subgroup of the second group and a refractivity np against a d line of the positive lens component from within the rear lens subgroup of the second group satisfy
    $-0.05 \leq nn-np \leq 0.2$.

17. The zoom lens system of claim 1, wherein a back focal length Bf in the wide-angle state and a maximum image height y satisfy
    $0.1 \leq Bf/y \leq 1.5$.

18. The zoom lens system of claim 1, wherein the negative lens component of the rear lens subgroup of the second group has a convex surface facing towards the image side.

19. The zoom lens system of claim 1, wherein the second positive lens component within the front lens subgroup of the second group includes at least two positive lens elements.

20. The zoom lens system of claim 1, wherein the first positive lens component within the front lens subgroup of the second group includes at least two positive lens elements.

21. A zoom lens system comprising from an object to an image side:
    a first lens group of negative refractive power including at least a negative lens component and a positive lens component arranged closer to the image side than the negative lens component; and a second lens group including, from the object to the image side, a front lens subgroup including, from the object to the image side, at least a first lens component of positive refractive power, a second lens component of negative refractive power and a third lens component of positive refractive power, and a rear lens subgroup including at least a negative lens component and a positive lens component, wherein the zoom lens system performs zooming operation by changing an air spacing between the first lens group and the second lens group, and a back focal length Bf in a wide-angle state and a maximum image height y satisfy $0.1 \leq Bf/y \leq 1.5$.

* * * * *